United States Patent [19]

Heighberger

[11] 4,069,854

[45] Jan. 24, 1978

[54] LOCKNUT WITH SEGMENTAL LOCKING ELEMENTS

[75] Inventor: Robert N. Heighberger, Pepper Pike, Ohio

[73] Assignee: Jos. Dyson & Sons, Inc., Eastlake, Ohio

[21] Appl. No.: 595,705

[22] Filed: July 14, 1975

[51] Int. Cl.² .............................................. F16B 39/28
[52] U.S. Cl. .................................................... 151/21 C
[58] Field of Search .............. 151/14 DW, 21 C, 21 B, 151/14 R, 14.5

[56] References Cited

U.S. PATENT DOCUMENTS

| | | | |
|---|---|---|---|
| 1,173,959 | 2/1916 | Hayes | 151/14 DW |
| 1,435,216 | 11/1922 | Davis | 151/14 DW |
| 1,885,459 | 11/1932 | McDonnell | 151/21 C |
| 2,299,209 | 10/1942 | Brackett | 151/21 B |

FOREIGN PATENT DOCUMENTS 347,667 4/1937 Italy .................................... 151/21 C

*Primary Examiner*—Marion Parsons, Jr.
*Attorney, Agent, or Firm*—Frank B. Robb

[57] ABSTRACT

There is disclosed locknut construction comprising a nut of form and size similar to a usual nut which includes a nut body and locking section integral therewith, said section including segments extending angularly, radially, inwardly, which are of pre-determined length, whereby flattening of the segments when the nut is tightened on a mating threaded member and against a bearing surface from which such member extends, will cause said segments to enter between the crests of said threads, tending to deform the same, resulting in locking of the locknut body against undesirable reverse rotation and loosening thereby.

7 Claims, 5 Drawing Figures

LOCKNUT WITH SEGMENTAL LOCKING ELEMENTS

OBJECTS OF THE INVENTION

It is a principal object of this invention to provide a locknut having integral locking elements formed thereon which are in the shape of segments extending radially inwardly and angularly with respect to the body, these segments being designed to enter between the crests of threads, or at least certain of the same, to thereby tend to mutilate said threads and lock the nut against reverse rotation when the nut is positioned on a mating threaded member and torqued against a bearing surface from which such mating member extends.

A further object of the invention is to provide a locknut wherein the segments have been particularly formed so as to be of a particular length and shape whereby the same will enter into the threads between the crests thereof on a corresponding and mated threaded member, whereby sufficient torquing may be resorted to to positively lock the nut against reverse rotation and yet the torquing will not be so difficult to effect that only a partial blocking action can be obtained.

A further object of the invention is to provide the locking segments of the locknut herein of such a length that the same will enter into the threads and extend into the mating threaded member sufficient distance to effect the locking action, this being determined as substantially twice the depth of the threads in the mating threaded member.

Yet another object of the invention is to provide a nut of the class described in which the locking portion is formed so that the thickness thereof is less than the thickness of the threads of a corresponding mated threaded member and substantially equal to the same, with the length of the segments at their longest dimension being such as to extend to the root diameter of the threads of the mating member deforming the same for a locking action.

Other and further objects of the invention will be understood from a consideration of the specification appended hereto and shown in the drawing wherein.

DESCRIPTION OF THE INVENTION

The nut disclosed herein is generally termed a free spinning locknut as opposed to prevailing torque locknut, initially emplaced in its position for subsequent locking action to be performed thereby, this being the desired condition where rapidity of assembly is sought, and yet final locking action is very effective to prevent loosening by whatever cause may exist.

This concept represents an improvement over the concept disclosed in my prior application, Ser. No. 507,887 filed Sept. 20, 1974 now abandoned, wherein a nut with integral locking element is disclosed, but in that instance the locking element is threaded and thus preliminarily engages the threads prior to assembly and locking action in contrast to the instant invention wherein the locking portion has no thread contact and does not effect any locking action until the nut is begun to be torqued into locking position.

Figure 1:
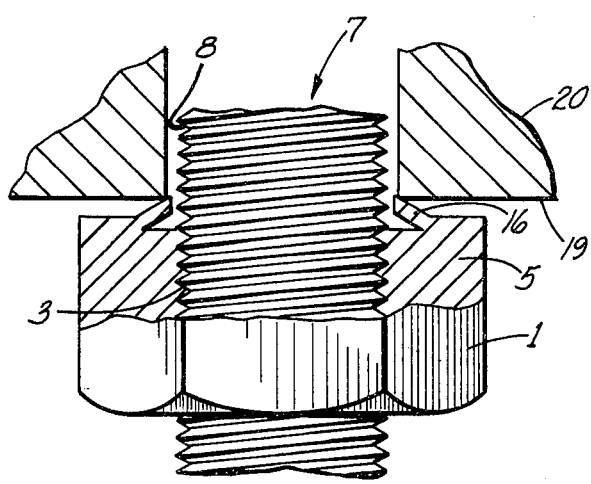
FIG. 1 is an enlarged fragmentary sectional view showing the nut of this invention in place upon a mating threaded member and in position for initial torquing to cause deformation of the locking segments and locking action thereby.
Figure 2:
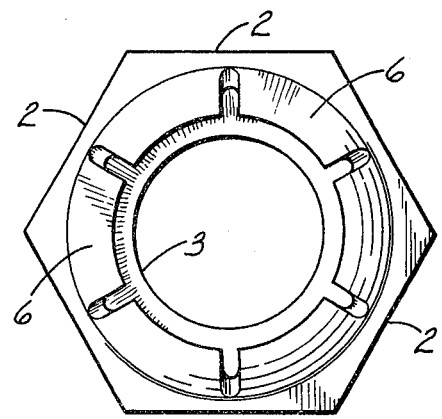
FIG. 2 is a top plan view of the nut of this invention, showing the segments into which the locking section is divided.

With the foregoing in mind, therefore, there is disclosed a nut body designated 1, of the usual hexagon form in plan as shown in FIG. 2, with the flats 2 for engagement by a nut or other tightening instrument.

The nut body 1 is provided interiorly with threads 3 and in this instance, it should be pointed out that because of the unique configuration, the nut hereof may be formed from what is known as an extra heavy pattern nut without any special tooling being required to form the nut initially, but tooling being required to machine the nut into the form shown in the various figures herein, wherein the locking portion 4 is machined out of the nut and is in reality an angularly, inwardly, and upwardly extending portion integral with the threaded section 5, this locking portion being formed into a series of segments 6, by suitable machining transversely of the nut across the flats although machining from corner might likewise be availed of, there being preferably six of such segments disclosed herein, this having been found to be particularly effective in operation.

Figure 3:
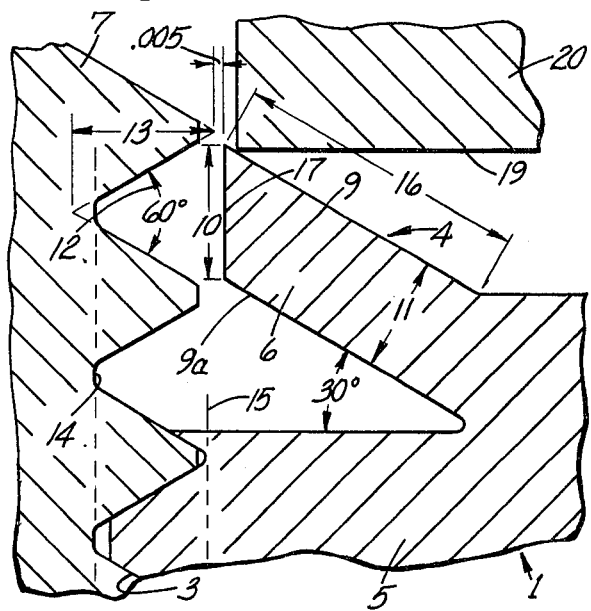
FIG. 3 is an enlarged fragmentary sectional view, illustrating in greater detail the relationship of the respective threads, and the locking segments in one position as initial tightening of the locknut is effected.

Turning to a consideration of FIG. 3, wherein the details of the construction are shown in enlarged form, the nut body 1 as to the threads hereof is shown as being positioned on a mating threaded member 7, with the mating threads 8 formed thereon.

At the locking portion of the nut referred to previously and designated 4, segment 6, as to one of the same, is shown in section as having a surface 9 outwardly thereof with an inward corresponding surface 9a parallel thereto, thereby forming the segment, and of a thickness which has been determined as most satisfactorily sized to correspond with but be slightly less than the distance between the theoretical crests of the threads 8 of the corresponding threaded member 7, so that the distance designated 10 is normally the pitch of one thread, and the distance designated 11 and thus the thickness of the segment 6 is less than such distance 10.

There is shown a usual thread form wherein the thread angle is 60° as indicated at 12 for the sake of this description, the height of the thread being indicated at 13, as being a maximum and theoretical height in contrast to the usual height or depth as the case may be of the threads in their actual machined form.

The root diameter of the threads is indicated by the dotted line 14, these being the exterior threads on the threaded member 7, the root diameter of the threads 3 of the nut 1 being designated 15.

Bearing in mind that the surface 9 as to the length thereof, indicated by the arrows and numeral 16, is substantially equal to twice the depth of the threads of the mating threaded member, again this having been found to be particularly effective in actual practice for locking action.

It should be explained that the clearance initially between the inner peripheral faces of the segments 6, said faces being designated 17, and the maximum theoretical crests of the threads 8, is about 0.005 inches, it will be seen that when the nut body 1 is initially positioned on the threaded member 7, that there will be no interference or contact with such threads by such face 17 of the segments 6.

It will be understood that the face of each segment 17 is in a cylindrical plane whose axis is the axis of the nut affording the clearance heretofore mentioned.

With the nut in the position shown in FIG. 3, wherein the locking segments 6 are initially in contact with surface 19 of a member or body 20 from which the threaded member 7 extends, it will be understood that rotation of the nut herein disclosed will cause the segments to be deformed by the member 20 and surface 19, so that they will be moved in what may be termed a flattening direction and at least certain segments enter into the threads of the mating threaded member 7.

Figure 4:
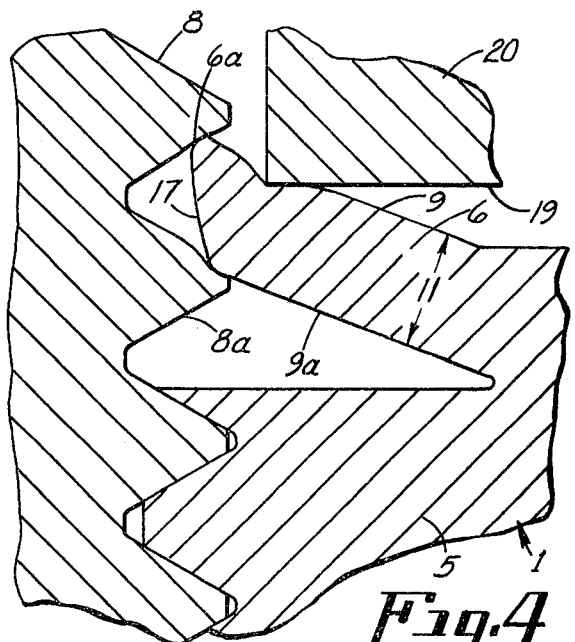
FIG. 4 is an enlarged fragmentary sectional view, where locking action has commenced after the position of FIG. 3.

Such a condition is illustrated in FIG. 4 as an initial or preliminary position wherein the segment 6 is shown as being initially deformed by the corner of the member 20, with the extremity of the segment 6 caused to engage one of the threads 8 of the member 7 at the underside and the upper side of the next thread, being designated for the purpose hereof as 8a, likewise commencing to be deformed by engagement of the segment 6.

Figure 5:
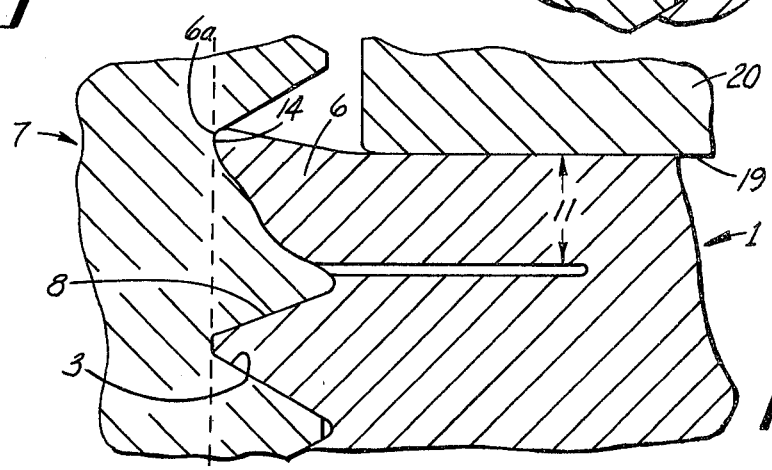
FIG. 5 is a view showing the locking action as effected when the nut is fully torqued into position, and the segments thereon are in locking relationship with the threads for at least an area of such thread to illustrate deformation taking place.

As the nut is further rotated and ultimately if torqued sufficiently, the same will cause the segment 6 to assume a position or condition such as is suggested in FIG. 5, wherein the extremity 6a is substantially at the root diameter 14 of the threads of the threaded member 7, the locking being thereby completely performed and untorquing of the nut being effected only after a predetermined resistance to such untorquing is overcome.

It has been determined that the length of this surface 9 shall be preferably substantially twice the depth of the threads 8 of the member 7.

It is noted that the initial angular disposition of the segments 6 as illustrated in FIG. 3, is at 30° with respect to the surface of the nut from which said segments extend, this having been determined to be the optimum angular relationship where the thread form is that disclosed.

Additional consideration having been given to the various relationships of the threads and locking segments, it has also been determined that the initial thickness of the segments is substantially equal to but not greater than the product of the pitch of the thread times the cosine 30°.

While it will be understood that in practice absolute flattening of the segments will not be usually effected, the consideration herein is that such is possible and under some conditions may be effected. This will usually not be required to effect satisfactory locking position although the dimensions and relationship of the various elements has been particularly determined to be as heretofore disclosed and described for the most satisfactory operation in a free spinning locknut of the type described.

A further factor in the invention herein which resides in the formation of the respective elements, is that the free ends of the segments terminate in a cylindrical plane, substantially coinciding with the theoretical root of the threads in the threaded section of the nut body to provide the necessary initial locking and ultimate locking possible under the conditions herein, and by reason of the formation of the various parts and sections of the nut as disclosed.

I claim:

1. In locknut construction of the class described, in combination, a mating member and a nut body, said nut body having a threaded section and a locking portion, said portion comprising a series of radial segments of substantially constant thickness extending angularly inwardly and upwardly out of the plane of the body and integrally connected thereto, wherein the free ends of the segments initially terminate in a cylindrical plane substantially coinciding with the theoretical root of threads in the threaded section of the body, the said segments having spaced upper and lower surfaces, the longest radial dimension of the segments being such that when the segments are flattened for locking engagement with the ends of the mating member by deforming such mating member threads and the ends of the nut body segments extend to the root diameter of the threads of such member, removal of said nut body thereafter requiring greatly increased effort resulting in further deforming of the threads of each part, said effort being substantially increased over that availed of to effect locking action.

2. The combination as claimed in claim 1, wherein the thickness of the segments of the locking portion is not greater than the length of the portion of the pitch of the threads represented by one of said threads.

3. The combination as claimed in claim 1, wherein the longest radial dimension of the segments is substantially equal to twice the depth of the threads.

4. The combination as claimed in claim 1, wherein the longest radial dimension of the segments is substantially equal to twice the depth of the threads of the mating threaded member.

5. The combination as claimed in claim 1, wherein the initial thickness of the segments is not greater than the product of the pitch times the cosine 30°.

6. The combination as claimed in claim 1, wherein the upper and lower surfaces of the segments are substantially parallel, and are initially at an angle of 30° with respect to the face of the nut body which engages a surface against which the nut is tightened.

7. The combination as claimed in claim 1, wherein the upper and lower surfaces of the segments are substantially parallel, and are initially at an angle of 30° with respect to the face of the nut body which engages a surface against which the nut is tightened, and the length of the longest surface is such that when the segments are flattened as stated, the extremity of such surface will extend to the root diameter of the threads of a mating threaded member.

* * * * *